W. T. WILLIE.
Cotton-Worm Poison Distributors.
No. 158,345. Patented Dec. 29, 1874.
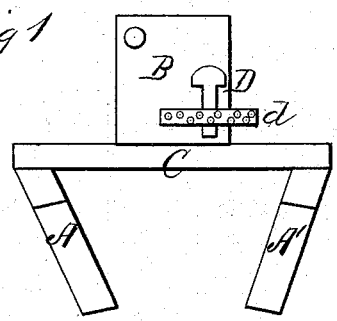
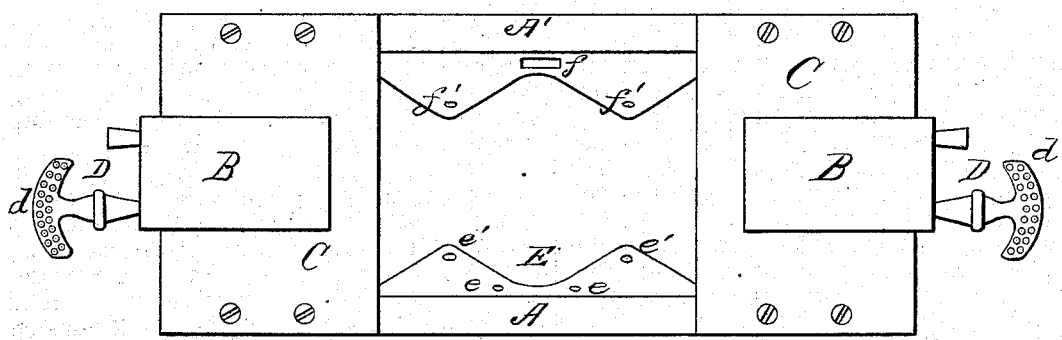
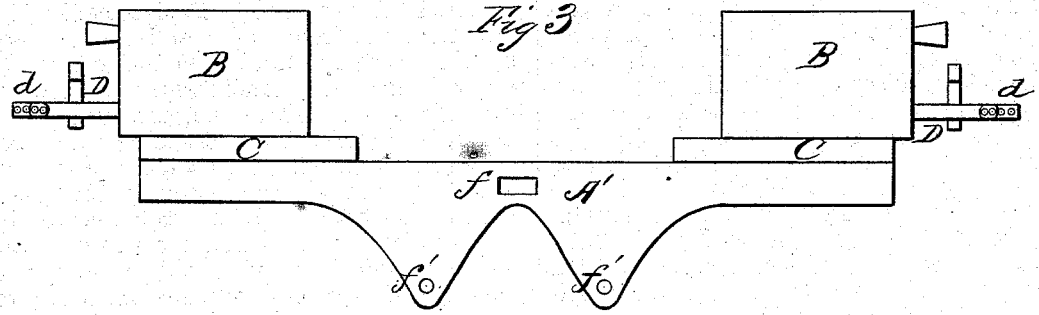
WITNESSES
Mary F. Utty.
Frank J. Masi.
INVENTOR
William T. Willie
Chipman Fosmer & Co
Attorneys

UNITED STATES PATENT OFFICE

WILLIAM T. WILLIE, OF INDEPENDENCE, TEXAS.

IMPROVEMENT IN COTTON-WORM-POISON DISTRIBUTERS.

Specification forming part of Letters Patent No. 158,345, dated December 29, 1874; application filed August 29, 1874.

*To all whom it may concern:*

Be it known that I, WILLIAM T. WILLIE, of Independence, in the county of Washington and State of Texas, have invented a new and valuable Improvement in Cotton-Worm-Poison Distributer; and I do hereby declare that the following is a full, clear, and exact description of the construction and operation of the same, reference being had to the annexed drawings, making a part of this specification, and to the letters and figures of reference marked thereon.

Figure 1 of the drawing is a representation of an end view of my poison-distributer. Fig. 2 is a plan view, and Fig. 3 is a side view, of the same.

This invention has relation to cotton-worm-poison distributers; and the novelty consists in a frame which is rigidly secured to a saddle upon a horse, in a transverse position, whereby an ordinary can, having a distributing-faucet for discharging liquid poisons, arranged upon both ends of the said frame, the one balancing the other, may be operated by the rider, one or both at the same time, as will be hereinafter more fully explained.

In the annexed drawings, A A' designate, respectively, the front and rear bars of my improved frame, connected together on each side by means of a platform, C, upon which are to be placed oil-cans B, or other convenient vessels for the reception of the destroying compounds. These vessels are removably secured thereto in any suitable manner, and their outer lateral edges are each provided with a distributing stop-cock, D, having a crescent-shaped perforated nozzle-piece, $d$, by means of which the liquid poison will be shed over a wide space. The front bar A has an angular notch, E, cut into its lower edge, near the apex of which, and one each side thereof, perforations $e$ are made, by means of which it is secured to the pommel of the saddle. It is also provided with perforations $e'$ upon its lower edge, by means of which it is laterally stayed by a rope passing thence to the girth-rings on each side of the saddle. The rear bar A' is in like manner notched, as shown in Fig. 2, and is provided with a slot, $f$, at the apex of its notch, by means of which it is strapped to the cantle of a saddle, and with perforations $f'$ along its lower edge, serving as a means of attachment for a rope, passing thence to the girth-rings on each side.

It will be seen from the above description that the frame is firmly attached both to the pommel and cantle of the saddle, and that it is braced and steadied to resist displacement by ropes or straps leading from the perforations $e'$ and $f'$ upon the front and rear bars of the frame, respectively, to the girth-rings on each side of the saddle, constituting a simple, convenient, and effectual attachment for the purpose of preventing any displacement. The notches of the front and rear bars A' A are intended to be straddled over that portion of the pad-frame of a saddle which projects in front of the pommel thereof, and extends in rear of the cantle, the rider being seated between the two, with a poison-receptacle on each side, with their stop-cocks within easy reach of his hand. He can thus accurately regulate the flow of poison according to the amount required to effect the purpose, the movement of the horse serving materially to assist the distribution.

What I claim as new, and desire to secure by Letters Patent, is—

In combination with the vessels B, for holding poison fluids, the saddle-frame A A' C, having notches E, perforations $e$ $e'$ $f'$, and slots $f$, substantially as specified.

In testimony that I claim the above I have hereunto subscribed my name in the presence of two witnesses.

WILLIAM THOMAS WILLIE.

Witnesses:
A. E. MORRISS,
WM. B. ROYALL.